2
UNITED STATES PATENT OFFICE.

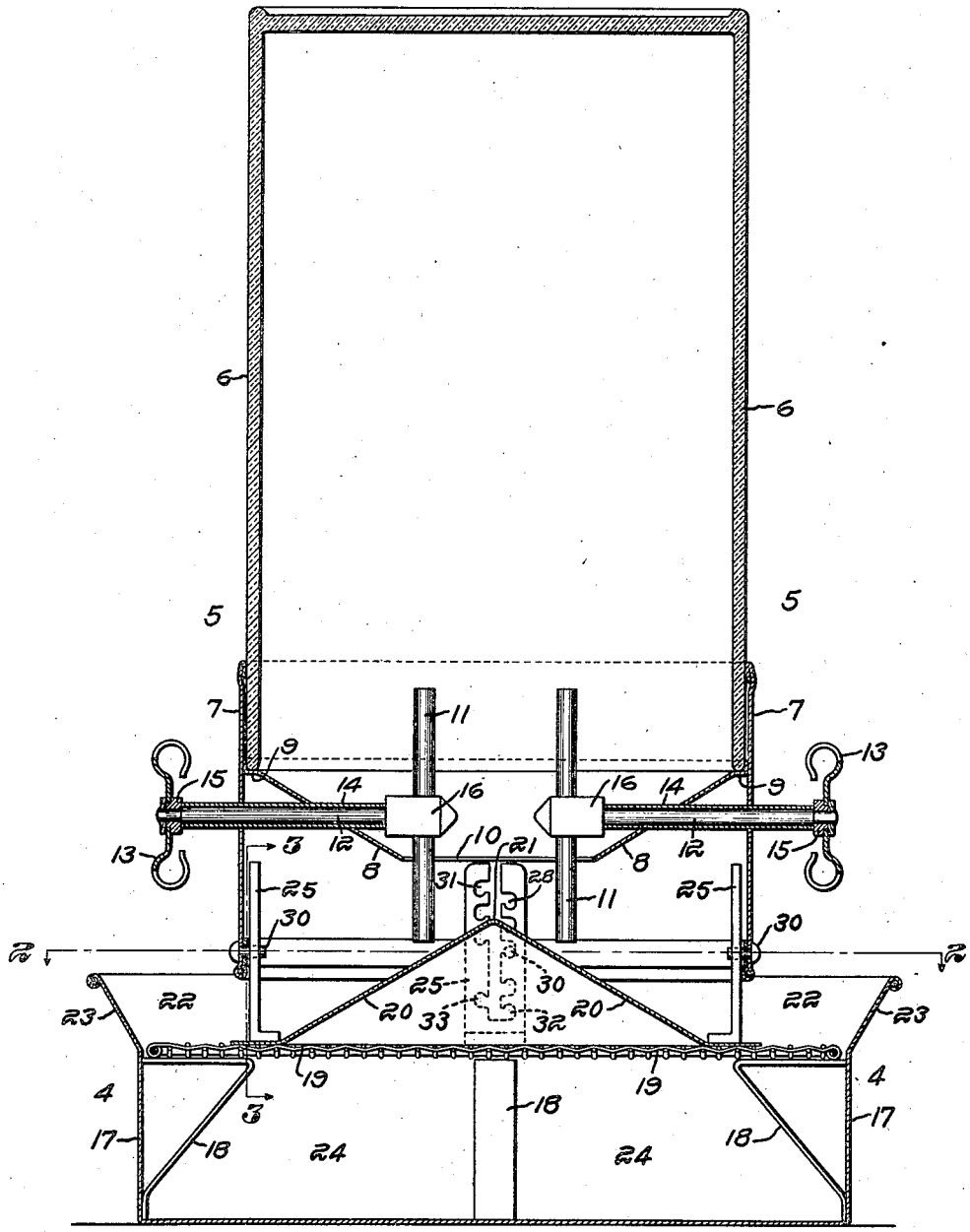

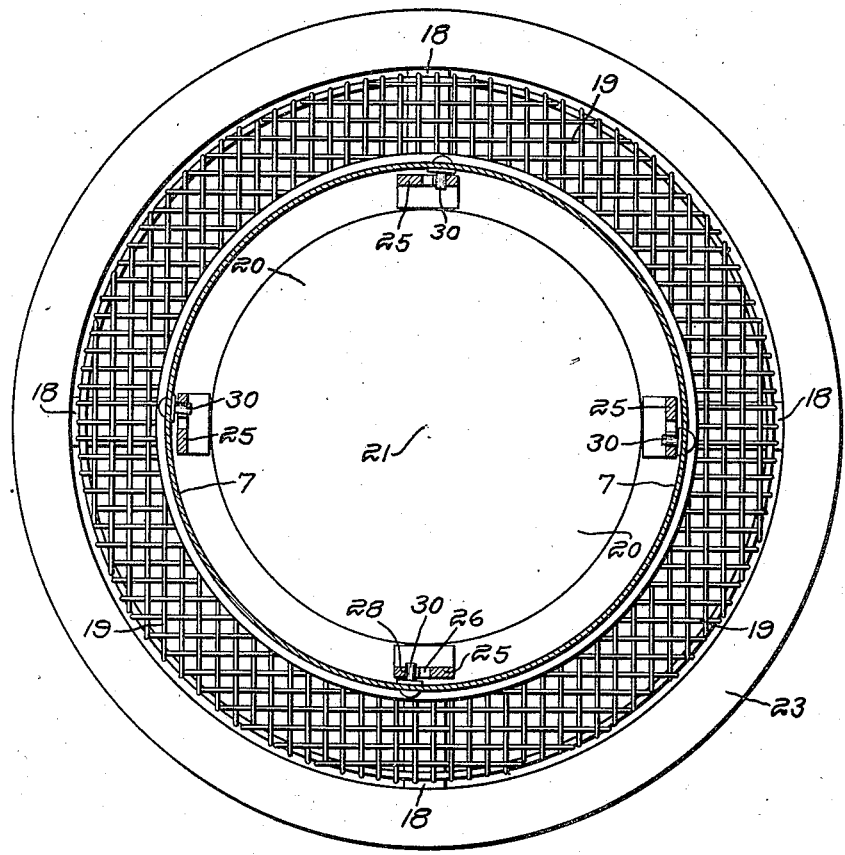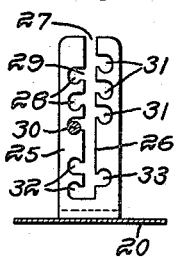

WALTER A. HILLIARD, OF MALDEN, MASSACHUSETTS, ASSIGNOR TO W. A. HILLIARD COMPANY, OF BOSTON, MASSACHUSETTS, A CORPORATION OF MASSACHUSETTS.

DISPENSING APPARATUS.

1,138,291.  Specification of Letters Patent.  Patented May 4, 1915.

Application filed December 4, 1912. Serial No. 734,810.

*To all whom it may concern:*

Be it known that I, WALTER A. HILLIARD, a citizen of the United States, and a resident of Malden, in the county of Middlesex and State of Massachusetts, whose post-office address is 70 Cliff street, Malden, Massachusetts, have invented an Improvement in Dispensing Apparatus, of which the following description, in connection with the accompanying drawings, is a specification, like characters on the drawings representing like parts.

This invention relates to dispensing apparatus, and more especially, though not exclusively, to an apparatus for dispensing loaf sugar.

My invention will be best understood by reference to the following specification, when taken in connection with the accompanying drawings, showing one illustrative embodiment thereof, while its scope will be more particularly pointed out in the appended claims.

In the drawings:—Figure 1 is a central, vertical section of one form of dispensing apparatus embodying my invention; Fig. 2 is a plan section on line 2—2 of Fig. 1; and Fig. 3 is a detail sectional view on line 3—3 of Fig. 1, looking toward the right.
Referring to the drawings, and to the embodiment of my invention which I have there shown for illustrative purposes, I provide a base designated generally by the numeral 4, and a superposed receptacle designated generally by the numeral 5, the latter being intended to receive and hold a supply of the loaf sugar or other material to be dispensed, and deliver the same onto the base in suitable quantities, where it will be accessible for use, while the principal body, or supply, will remain protected against dust and dirt.

While the receptacle may be of any other suitable construction, it herein comprises an inverted jar 6, preferably of glass, through which the contents may be viewed, and a casing 7 encircling and supporting the jar. Preferably, the casing 7 is provided with a retarder 8, herein in the form of an inverted, truncated cone, having its perimeter meeting the lateral wall of the casing, and preferably provided with an annular seat 9 for the rim, or mouth, of the jar. The retarder 8 is provided with a central opening 10, serving as a constricted outlet for the loaf sugar or other material, and permitting the escape of the material in suitable restricted quantities upon the base.

As a means for agitating the material at the outlet, in case it should become clogged, I provide suitable agitating means, herein in the form of two agitators 11—11, consisting of rods located principally within the receptacle, and depending into and preferably through the opening 10. These rods are suitably secured to shafts 12—12, passing laterally through the retarder 8, and through the lateral wall of the casing 7 to the exterior of the latter, where they are provided with suitable operating means, herein a pair of handles 13—13. While the shafts 12 may be mounted in any other suitable manner, they are herein provided with bearings 14—14, in the form of tubes, secured in fixed position in the casing 7, the outer ends of the tubes abutting against hubs 15 of the handles, and the inner ends abutting against shoulders 16 provided on the shafts, thus effectually holding the latter against longitudinal movement, while permitting them to be freely rocked to and fro by means of the handles.

While the base 4 may be of any suitable construction, it herein comprises a pan 17, provided internally with a series of supports 18, in the form of brackets, upon which is loosely mounted a support 19 in the form of a screen, upon the central portion of which is secured a cone 20, having its apex 21 located beneath the opening 10, so as to direct the outflowing material laterally through an opening 22 beneath the lower edge of the casing 7 onto the marginal portion of the screen 19 beyond the perimeter of the base of the cone. The pan 17 is preferably provided with an outwardly flaring wall or flange 23, which serves to retain the loaves of sugar as the latter rest upon the screen, while any granulated sugar formed by the crumbling of the loaves will pass through the screen into a chamber 24 located therebelow. The granulated sugar will collect in this chamber, and may be removed therefrom, and utilized for other purposes.

The receptacle and base are preferably provided with interengaging means permitting them to be relatively adjusted vertically, by simply shifting their point of interengagement, so as to vary the size of the opening 22, or closing the latter entirely at will. Herein, the base is provided with a plurality of uprights 25, each having a vertical slot 26, provided with an entrance 27 at its upper end. The uprights 25 are provided with a series of recesses, or notches 28, having lateral entrances 29 leading from the vertical slot 26, and adapted to receive fixed pins 30 secured to and projecting laterally inward from the casing 7, so as to support the latter. Preferably, the entrance of these notches or recesses are located above the seating portions thereof, so as to prevent accidental dislodgment of the pins 30. The notches or recesses 28 are located at different heights, so that by simply rotating the casing 7 until the pins 30 pass out of the notches into the vertical slot 26, the pins may be placed in other notches located at different heights. If desired, the uprights 25 may be provided with a second series of notches or recesses 31, similar to the notches 28, and placed in staggered relation thereto, so that a finer adjustment of the opening 22 may be secured. By this means, the size of the opening 22 may be regulated within the limits of adjustment provided, and the flow of the material may be regulated to suit the requirements.

The flow of the material may be entirely cut off by simply rotating the casing 7 the required distance to carry the pins 30 out of the notches in which they are located into the vertical slot 27, and then dropping the casing until the pins approach the bottoms of the slots, so that the lower edge of the casing will cut off the escape of the material. When the receptacle requires replenishing, this may be accomplished by lowering the casing 7, so as to cut off the escape of any material that may remain therein, and then lifting the receptacle, together with the cone 20 and the screen 19, and inverting the receptacle. To facilitate the inversion of the receptacle, it is desirable that there shall be suitable provision for locking the latter to the screen, and to that end, the uprights 25 are herein provided with a plurality of notches or recesses 32—32 and 33, adapted to receive the pins 30. The form of these notches or recesses is similar to that of the notches or recesses 28, except that the entrances of the former are located below their seating portions so as to prevent accidental dislodgment of the pins 30, when the receptacle carrying the screen 19 and cone 20 is lifted. In some cases, it may be impossible to entirely close the opening 22, because of the presence of loaves of sugar beneath the lower edge of the casing 7, and hence the several notches 32 and 33 form a convenient means for locking the casing at different heights preparatory to lifting the latter.

When the receptacle has been inverted, it may be unlocked and detached from the uprights 25, by withdrawing the pins 30 through the upper ends of the slots 26, after which the jar may be filled through the opening 10, or the casing 7, if desired, may be removed from the jar to allow the latter to be filled directly through its open mouth. After the jar has been refilled, it may be returned to its position upon the base, by simply a reversal of the foregoing operation, and may be placed at the desired position of adjustment vertically by positioning the pins 30 in the proper set of notches or recesses in the uprights.

It will now be readily apparent that the described apparatus forms a simple and effective means for dispensing loaf sugar or other material in limited quantities, while protecting the main supply of the material from dust and dirt, and preventing persons from dipping their hands into the mass of sugar, as is the case where the latter is supplied in an open vessel.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts nor to its specific embodiment herein shown, but that extensive deviations from the illustrated form or embodiment of the invention may be made without departing from the principles thereof.

Having thus described my invention, what I claim and desire by Letters Patent to procure is:—

1. A dispensing apparatus having, in combination, a base and a superposed receptacle having interengaging means permitting them to be relatively adjusted by simply shifting their point of interengagement, said receptacle having an open bottom above said base.

2. A dispensing apparatus having, in combination, a base and a superposed receptacle having interengaging means permitting them to be relatively adjusted by simply relatively turning one upon the other about an axis and relatively moving them longitudinally of said axis, said receptacle having an open bottom above said base.

3. A dispensing apparatus having, in combination, a base and a superposed receptacle, one provided with a plurality of lateral notches, and the other provided with means supported in said notches, said receptacle having an open bottom above said base.

4. A dispensing apparatus having, in combination, a base and a superposed receptacle, one provided with a plurality of series of lateral notches, the several notches of each series being located one above another, and the other being provided with means supported in a notch of each series, said receptacle having an open bottom above said base.

5. A dispensing apparatus having, in combination, a base and a superposed receptacle, one provided with a plurality of slots and notches leading laterally therefrom and the other being provided with means supported in said notches, said receptacle having an open bottom above said base.

6. A dispensing apparatus having, in combination, a base and a superposed receptacle, one provided with a plurality of notches having lateral entrances, and the other provided with means seated in notches and means to prevent accidental withdrawal of said means form said notches, said receptacle having an open bottom above said base.

7. A dispensing apparatus having, in combination, a base and a superposed receptacle, one provided with a plurality of slots and notches arranged in staggered relation alternately on opposite sides of each slot, and the other being provided with means supported in a notch of each set, said receptacle having an open bottom above said base.

8. A dispensing apparatus having in combination a receptacle having an outlet at its bottom and having a plurality of lateral projections, and a base having a plurality of uprights provided with recesses having lateral entrances to receive said projections, said uprights being separated from each other by spaces communicating with said outlet.

9. A dispensing apparatus having, in combination, a receptacle having an outlet at its bottom and having a plurality of lateral projections, and a base having a plurality of uprights each having a slot having an entrance at the top of said upright and a plurality of lateral recesses leading from said slot and adapted to receive said projections.

10. A dispensing apparatus having in combination, a receptacle having a discharge opening, and a base having an apertured support projecting laterally from said receptacle for the material to be discharged onto, a wall rising from said support and limiting the outflow of the material from the discharge opening and separated from the latter by the apertured surface onto which the material is discharged, and a chamber beneath said support to receive material passing through the apertures therein.

11. A dispensing apparatus having, in combination, a receptacle having an outlet at its bottom and a chamber below and larger than said outlet, an agitator located partly within said receptacle and depending through said outlet into said chamber, and means above said outlet for operating said agitator.

12. A dispensing apparatus having, in combination, a receptacle having an outlet at its bottom and a chamber below said outlet, a shaft extending laterally into said receptacle above said outlet, and an agitator secured to said shaft within said receptacle and depending through said outlet into said chamber.

13. A dispensing apparatus having, in combination, a receptacle comprising an inverted jar, a casing encircling the lower part of said jar, a retarder having a central opening and having its perimeter meeting the lateral wall of said casing, and a base having a conical surface whose apex is located beneath said opening.

In testimony whereof I have signed my name to this specification in the presence of two subscribing witnesses.

WALTER A. HILLIARD.

Witnesses:
LOUIS A. JONES,
CLARA L. STUART.